United States Patent [19]

Sakai

[11] Patent Number: 5,722,368
[45] Date of Patent: Mar. 3, 1998

[54] METHOD AND APPARATUS FOR ADJUSTING THE INTAKE AIR FLOW RATE OF AN INTERNAL COMBUSTION ENGINE

[75] Inventor: Shoichi Sakai, Atsugi, Japan

[73] Assignee: Unisia Jecs Corporation, Kanagawa-ken, Japan

[21] Appl. No.: 821,348

[22] Filed: Mar. 20, 1997

[30] Foreign Application Priority Data

Mar. 28, 1996 [JP] Japan .................................. 8-074362

[51] Int. Cl.$^6$ .................................................. F02M 3/00
[52] U.S. Cl. .................................................. 123/339.23
[58] Field of Search ......................... 123/339.23, 339.22, 123/339.17, 325, 353, 352; 364/431.07, 424.01, 431.05

[56] References Cited

U.S. PATENT DOCUMENTS

| | | | |
|---|---|---|---|
| 5,421,302 | 6/1995 | Livshits et al. | 123/339.23 |
| 5,623,903 | 4/1997 | Ueda | 123/339.23 |
| 5,630,394 | 5/1997 | Grizzle et al. | 123/339.23 |
| 5,642,707 | 7/1997 | Cerf et al. | 123/339.23 |

FOREIGN PATENT DOCUMENTS 64-35036  2/1989  Japan ................................ 123/339.23

*Primary Examiner*—Raymond A. Nelli
*Attorney, Agent, or Firm*—Lowe, Price, LeBlanc & Becker

[57] ABSTRACT

With an internal combustion engine wherein a throttle valve is disposed in an intake system, idle operation is carried out immediately after engine manufacture, and intake air flow rate is feedback controlled so that engine rotation speed approaches a target rotation speed. The control value when the target rotation speed is obtained is learned, and the learned result for the obtained control value is stored as an initial idle intake air flow rate adjustment value. As a result, initial fluctuations in idle intake air flow rate due to initial component and engine variations occurring at manufacture can be corrected. Hence, from the start, the idle intake air flow rate can be optimally adjusted so that the idle rotation speed rapidly converges on the target value.

8 Claims, 3 Drawing Sheets

METHOD AND APPARATUS FOR ADJUSTING THE INTAKE AIR FLOW RATE OF AN INTERNAL COMBUSTION ENGINE

FIELD OF THE INVENTION

The present invention relates to a method and apparatus for adjusting fluctuations in intake air flow rate at the time of initial idling of an internal combustion engine.

DESCRIPTION OF THE RELATED ART

As is known with internal combustion engines incorporating electronically controlled fuel injection apparatus, the intake air flow rate is controlled by controlling the opening of a solenoid type idle control valve disposed in a passage which bypasses a throttle valve of an intake system, and feedback control is carried out so that the idle rotation speed approaches a target rotation speed.

For example there is an arrangement (refer to Japanese Unexamined Patent Publication No. 64-35036) where required intake air flow rates for each of the various operating condition parameters are set corresponding to the engine operating conditions, and opening control is then carried out by looking up from a map, a control value for the idle control valve opening corresponding to the target intake air flow rates obtained as the sum of the required intake air flow rates.

With this arrangement for controlling the idle rotation speed using an idle control valve, the correlation between the control value for the idle control valve opening, and the target intake air flow rate, deviates due to causes such as; variations in engine friction and changes with time, small gaps between the fully closed throttle valve and the intake passage wall, and initial fluctuations and sticking in the auxiliary intake passage system which includes the idle control valve. Therefore feedback control must be carried out.

However, when with the control value deviated, the actual intake air flow rate deviates from the target intake air flow rate, it takes time until the fluctuations in the correlation between the control value and the target intake air flow rate are corrected by the feedback control. Hence engine rotational stability is affected.

An adjustment screw is therefore provided in the bypass passage in which the idle control valve is disposed, and after engine manufacture, the factory or the dealer carries out mechanical adjustment of the initial intake air flow rate at idle, by adjusting this adjustment screw. However with this adjustment, as well as taking time, it is not always possible to obtain sufficient accuracy.

SUMMARY OF THE INVENTION

The present invention takes into consideration the above problems with the conventional arrangement, with the object of obviating the need for the adjustment screw and the adjustment screw operation, by correcting for fluctuations in the initial intake air flow rate using idle rotation speed control.

Moreover, an object of the invention is to be able to accurately correct fluctuations in the initial intake air flow rate.

A further object of the invention is to separately carry out, learning at the time of idling for correcting fluctuations in the initial intake air flow rate, and learning at the time of normal idling, to thereby effect optimum learning of each.

Therefore, the method (and apparatus) according to the present invention for adjusting the intake air flow rate of an internal combustion engine, comprises:

- a step (idle rotation speed control device) for carrying out idle operation immediately after manufacture of an internal combustion engine having a throttle valve disposed in an intake system, and carrying out idle rotation speed control by feedback controlling intake air flow rate so that engine rotation speed approaches a target rotation speed;
- a step (initial idle learning device) for learning a control value when a target rotation speed is obtained during said idle rotation speed control immediately after engine manufacture; and
- a step (initial idle learning value storage device) for storing as an initial idle intake air flow rate adjustment value, the learned result for the control value obtained during the idle rotation speed control immediately after engine manufacture.

With such a construction, then the initial fluctuations in the intake air flow rate at the time of idling, due to initial component and engine variations occurring at manufacture, can be optimally adjusted by carrying out learning (using the initial idle learning device) and storing the learned results (using the initial idle learning value storage device), so that from the start, the intake air flow rate at the time of idling rapidly converges on the target value.

Moreover, the idle rotation speed control (by the idle rotation speed control device) may be carried out by integral control, and a learned result obtained by averaging integral values in the integral control may be stored (using the initial idle learning value storage device) as an initial idle intake air flow rate adjustment value.

With such an arrangement, by averaging integral values in the integral control of the idle rotation speed, then high learning accuracy can be obtained and the initial idle intake air flow rate can thus be adjusted to a high accuracy.

Moreover, the arrangement may include:

- a step (normal idle learning device) for learning a control value when controlled by the idle rotation speed control device at the time of normal idle operation, and
- a step (initial idle learning value storage device and normal idle learning value storage device) for storing in separate storage devices, the learned result at the time of normal idle operation, and the learned result immediately after engine manufacture.

With such a construction, the idle rotation speed control value can be learned (by the normal idle learning device) during normal idle operation, and changes in the intake air flow rate due for example to changes in component characteristics with time, thus corrected. However, with the fluctuations in the intake air flow rate at the time of initial idling, since there are often cases where these are very large compared to the changes in the intake air flow rate at the time of normal idle operation, then the idle learning values are stored independently (in the initial idle learning value storage device and the normal idle learning value storage device), and through their respective use, the initial large fluctuations in the idle intake air flow rate can be corrected, and the subsequent changes due to changes with time can be finely corrected.

Furthermore, the idle rotation speed control (by the idle rotation speed control device) may involve for example controlling idle rotation speed by controlling the opening of an idle control valve disposed in a bypass passage connected to an intake air passage and bypassing the throttle valve.

With this construction, accurate idle rotation speed control can be carried out by controlling the opening of the idle control valve disposed in the bypass passage. As a result, the initial idle intake air flow rate can be more accurately adjusted. With the present invention however, instead of idle rotation speed control using the idle control valve, this can also be carried out using an arrangement for carrying out idle rotation speed control by controlling the fully closed opening of the throttle valve.

DESCRIPTION OF THE PREFERRED EMBODIMENTS

As follows is a description of an embodiment of the present invention with reference to the drawings.

Figure 1:
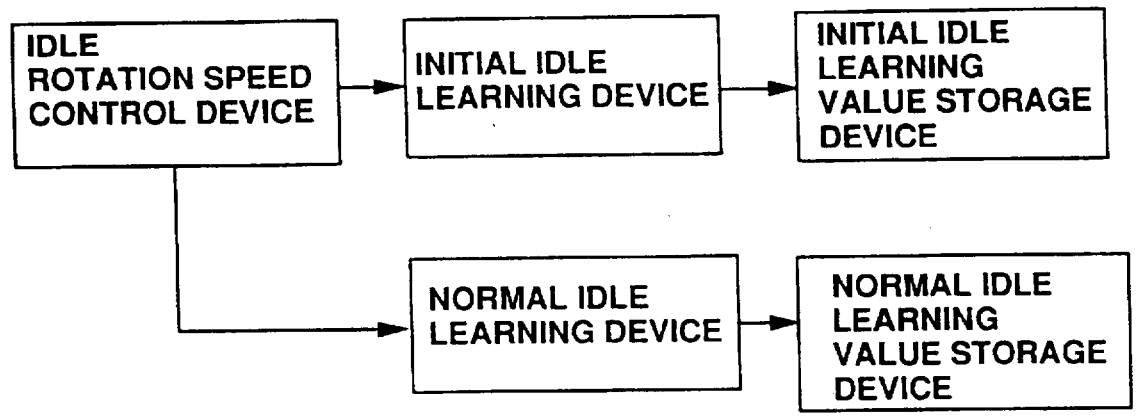
FIG. 1 is a block diagram illustrating the configuration and function of the present invention.
Figure 2:
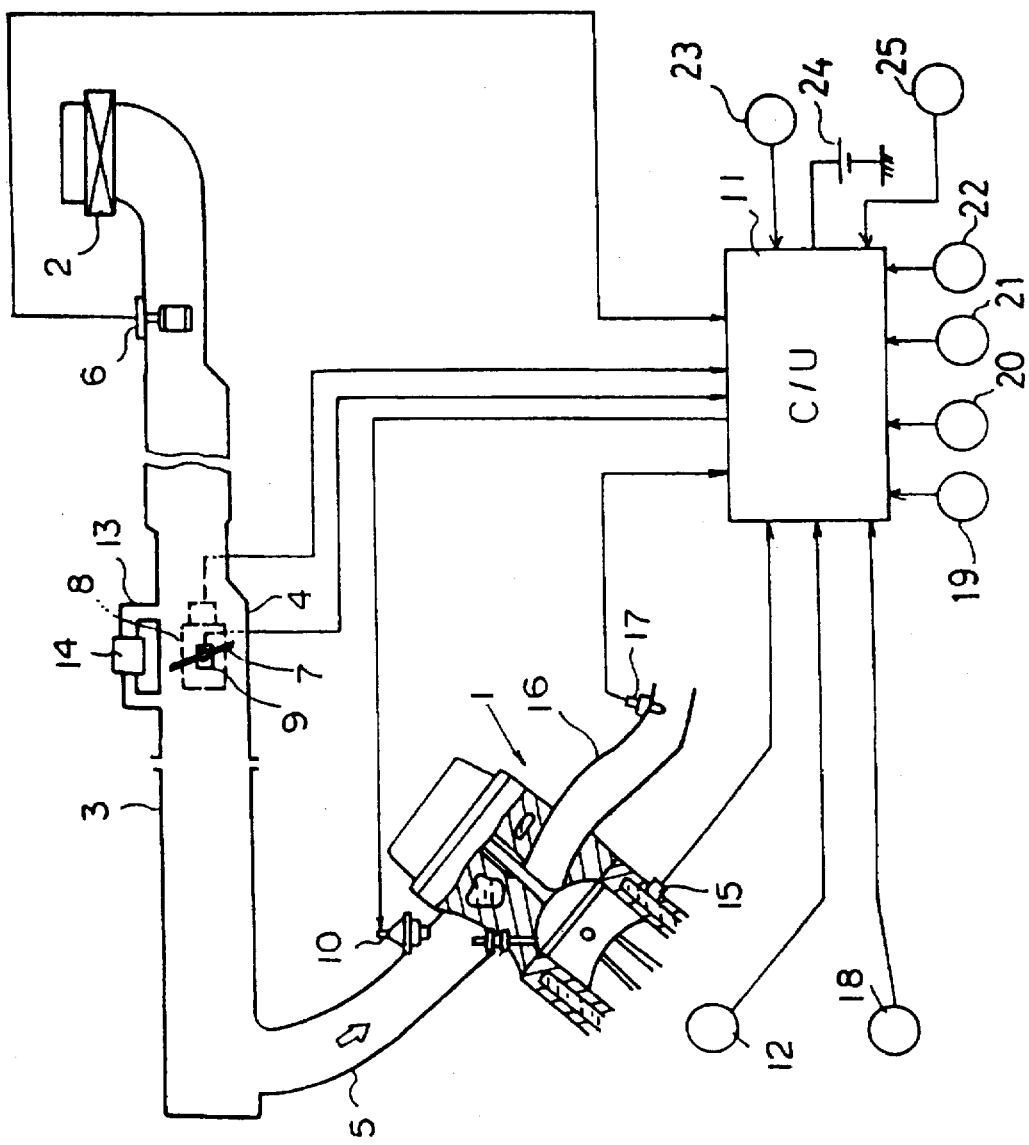
FIG. 2 shows a system configuration of an embodiment of an idle rotation speed learning control apparatus for an internal combustion engine, according to the present invention.

In FIG. 2, an internal combustion engine 1 draws in air via an air cleaner 2, an intake duct 3, a throttle chamber 4, and an intake manifold 5.

An air flow meter 6 is provided in the intake duct 3 for detecting an intake air flow rate Q. A throttle valve 7, which is linked to a accelerator pedal (not shown in the figure), is provided in the throttle chamber 4, for controlling the intake air flow rate Q. The throttle valve 7 is provided with a throttle sensor 8 for detecting the throttle valve opening TVO using a potentiometer, and an idle switch 9 which switches on at the time of idling when the throttle valve 7 is at a predetermined opening or less.

Solenoid type fuel injection valves 10 are provided in the intake manifold 5 for each cylinder, for injecting fuel which has been supplied from a fuel pump (not shown in the figure) and controlled to a predetermined pressure by a pressure regulator, into the intake manifold 5.

Control of the fuel injection quantity involves computing in a control unit 11 incorporating a microcomputer, a basic fuel injection quantity $T_P$ using the intake air flow rate Q detected by the air flow meter 6, and an engine rotation speed N computed based on a signal from a crank angle sensor 12 housed in a distributor. The basic fuel injection quantity $T_P$ is then corrected for cooling water temperature and the like, to thereby compute a final fuel injection quantity $T_I$. A drive pulse signal of a pulse width corresponding to the fuel injection quantity $T_I$ is then output to the fuel injection valves 10, synchronized with the engine rotation speed, to thereby inject fuel in the required quantity into the engine 1.

An idle control valve 14 is disposed in an auxiliary air passage 13 provided so as to bypass the throttle valve 7. When the idle switch 9 is switched on at idling, feedback control (referred to hereunder as ISC) is carried out so that the engine rotation speed approaches a target rotation speed, by increasing or decreasing the opening of the idle control valve 14 to increase or reduce the intake air flow rate. Basically, in the case where loads for example from a power steering unit or air conditioner are being driven, this involves adding control values $ISC_{PS}$, $ISC_{AC}$ corresponding to the respective load drives to a basic control value $ISC_B$ of the idle control valve 14 which corresponds to a target intake air flow rate set based on engine cooling water temperature or the like, to thereby compute a feed forward portion. A feedback correction amount ISCf which is increasingly or decreasingly set by integral control so as to be successively reduced by a predetermined value when the actual engine rotation speed is greater than a target rotation speed, and so as to be successively increased by a predetermined value when the actual engine rotation speed is less than the target rotation speed, is then added to the feed forward component so as to obtain the control value ISC for the opening of the idle control valve 14.

A water temperature sensor 15 is provided for detecting a cooling water temperature $T_W$ inside the cooling jacket of the engine 1, and an air-fuel ratio sensor 17 is provided for detecting the air-fuel ratio of the intake mixture, by detecting oxygen concentration in the exhaust gases in an exhaust passage 16.

Moreover, various signals from a power steering switch 18 for switching the power steering unit on and off, an air conditioning switch 19 (for switching an air compressor drive on and off to maintain the vehicle interior at a set temperature), a lamp switch 20 for lighting, an electric type radiator fan switch 21, a neutral switch 22 which comes on when the gears in the automatic transmission are in the neutral position and goes off at other times, and an ignition switch 23, as well as a voltage signal from a battery 24, and a vehicle speed signal from a vehicle speed sensor 25, are output to the control unit 11.

Figure 3:
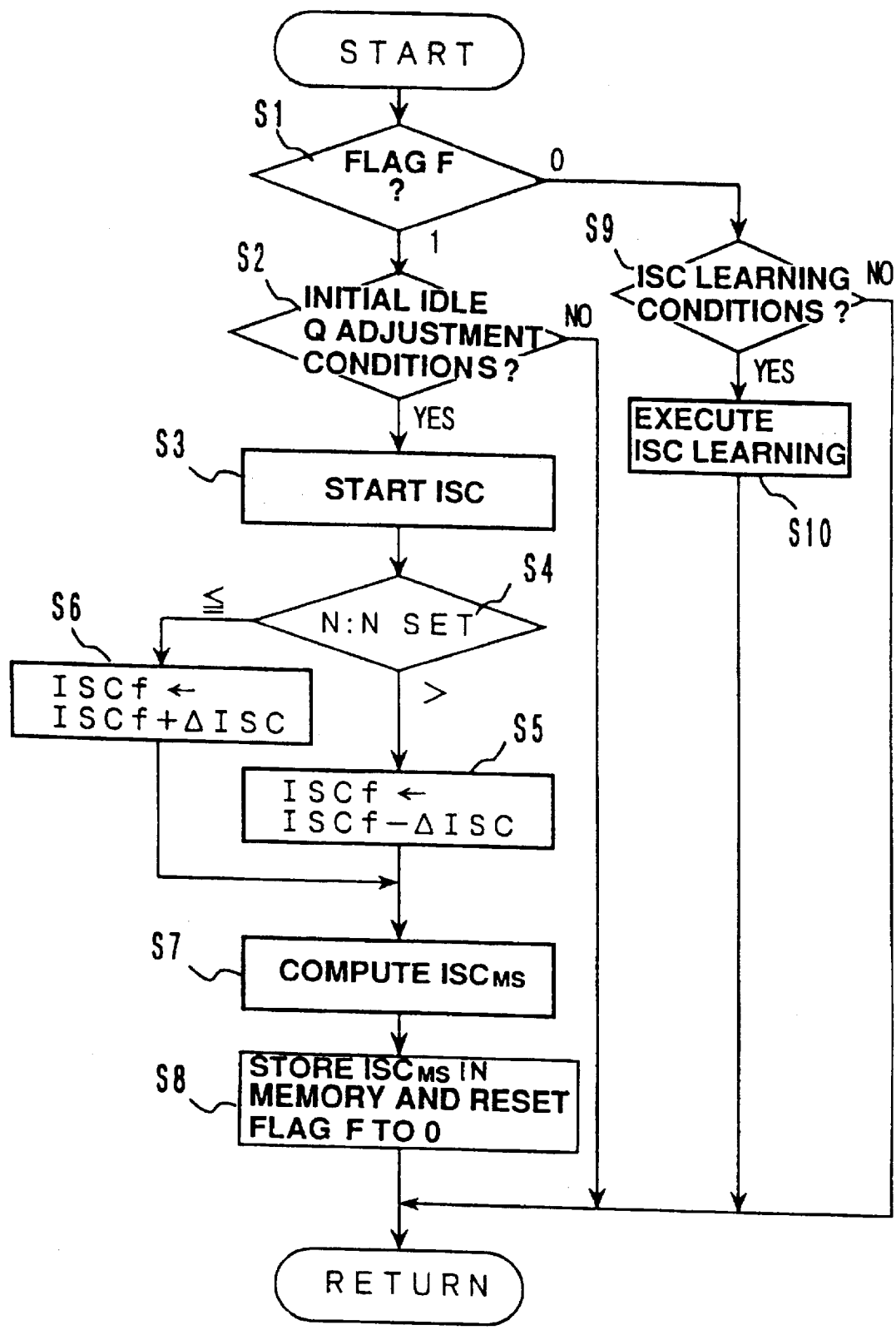
FIG. 3 is a flow chart showing an initial idle learning and normal idle learning routine for the embodiment.

As follows is a description with reference to the flow chart of FIG. 3, of a learning control according to the present invention using the control unit 11, for opening control values for the idle control valve, including initial idle intake air flow rate adjustment carried out immediately after engine manufacture.

In step 1, a value of a flag F set to 1 for conditions immediately after engine manufacture, is judged.

When judged in step 1 that the value of the flag F is 1, that is to say when judged that conditions are for immediately after engine manufacture, control proceeds to step 2 where it is judged if initial idle intake air flow rate adjustment conditions (for example the ISC execution conditions have materialized after a predetermined time from starting, electrical loads and the like are not being applied, and the water temperature and the battery voltage are within a predetermined range) have been satisfied.

When judged in step 2 that the initial idle intake air flow rate adjustment conditions are satisfied, control proceeds to step 3 and the subsequent steps to thereby carrying out initial idle intake air flow rate adjustment.

In step 3, with the throttle valve fully closed, the idle operation is started with the opening control value for the idle control valve made the basic control value $ISC_B$ corresponding to the target intake air flow rate for the current water temperature.

In step 4, the magnitude of the engine rotation speed N computed based on a signal from the crank angle sensor 12, and the magnitude of a target rotation speed $N_{SET}$ are compared. If the engine rotation speed N is greater than the target rotation speed $N_{SET}$, control proceeds to step 5 where a predetermined amount $\Delta ISC$ is subtracted from the feedback correction amount ISCf for the opening control value ISC for the idle control valve, while if the engine rotation speed N is less than or equal to the target rotation speed $N_{SET}$, control proceeds to step 6 where a predetermined amount $\Delta ISC$ is added to ISCf.

In step 7, learning is carried out to compute an average value $ISC_{MS}$ (=ISCf/n; where n=number of integrations, alternatively the ISCf values for when the magnitude relationship of the engine rotation speed N and target rotation speed $N_{SET}$ inverts, may be stored for even times, and the average of these obtained) for the feedback correction amount (integral value) ISCf set by integral control in the above manner.

In step 8, the average value $ISC_{MS}$ is stored in memory as the adjustment value for the initial idle intake air flow rate. In this case this is stored, based on the current water temperature, in one of several regions divided according to water temperature. Initial learning is then completed and hence the value of the flag F is reset to 0.

In this way, a control value is learned by carrying out feedback control of the idle rotation speed immediately after engine manufacture, and the learned result then stored as an adjustment value for the initial idle intake air flow rate. Then by controlling the idle control valve as described hereunder using the adjustment value, control can be made to an appropriate intake air flow rate without influence from initial fluctuations at the original start of the idle operation. Consequently, the idle rotation speed can be made to rapidly converge on the target rotation speed.

After completion of initial learning, since the flag F in step 1 has been reset to 0, control proceeds to step 9 where it is judged if the ISC conditions for the time of normal operation have materialized. If materialized, control proceeds to step 10 where idle rotation speed control and control value learning for the time of normal operation is carried out.

This involves increasingly or decreasingly setting the feedback correction value with a value where, as well as electrical load values for the air conditioner and power steering unit when operating, the initial idle intake air flow rate adjustment value $ISC_{MS}$ for each water temperature looked up from the memory, is added to the basic control value $ISC_B$ as the initial value, and then in a similar manner to the above, storing in memory as the learning value, an average value $ISC_{MD}$ of the integral values ISCf. Here the memory for storing the initial idle intake air flow rate adjustment value $ISC_{MS}$, and the memory for storing the average value $ISC_{MD}$ at the time of normal operation are made different. Alternatively, these values may be stored in different memory regions in the same memory.

I claim:

1. A method of adjusting the intake air flow rate of an internal combustion engine comprising:
    a step for carrying out idle operation immediately after manufacture of an internal combustion engine having a throttle valve disposed in an intake system, and carrying out idle rotation speed control by feedback controlling intake air flow rate so that engine rotation speed approaches a target rotation speed;
    a step for learning a control value when a target rotation speed is obtained during said idle rotation speed control immediately after engine manufacture;
    a step for storing as an initial idle intake air flow rate adjustment value, the learned result for the control value obtained during said idle rotation speed control immediately after engine manufacture.

2. A method of adjusting the intake air flow rate of an internal combustion engine according to claim 1, wherein said idle rotation speed control is carried out by integral control, and a learned result obtained by averaging integral values in said integral control is stored as an initial idle intake air flow rate adjustment value.

3. A method of adjusting the intake air flow rate of an internal combustion engine according to claim 1, said method further comprising:
    a step for learning a control value when controlled by said idle rotation speed control step at the time of normal idle operation, and
    a step for storing in separate storage means, the learned result at the time of normal idle operation, and the learned result immediately after engine manufacture.

4. A method of adjusting the intake air flow rate of an internal combustion engine according to claim 1, wherein said idle rotation speed control involves controlling idle rotation speed by controlling the opening of an idle control valve disposed in a bypass passage connected to an intake air passage and bypassing said throttle valve.

5. An apparatus for adjusting the intake air flow rate of an internal combustion engine comprising:
    idle rotation speed control means for carrying out feedback control of intake air flow rate so that at the time of idling of an internal combustion engine wherein a throttle valve is disposed in an intake system, engine rotation speed approaches a target rotation speed;
    initial idle rotation speed control executing means for carrying out idle rotation speed control immediately after engine manufacture using said idle rotation speed control means;
    initial idle learning means for learning a control value when a target rotation speed is obtained during said idle rotation speed control immediately after engine manufacture; and
    initial idle learning value storage means for storing as an initial idle intake air flow rate adjustment value, the learned result for the control value learned by said initial idle learning means.

6. An apparatus for adjusting the intake air flow rate of an internal combustion engine according to claim 5, wherein said idle rotation speed control means carries out idle rotation speed control by integral control, and said initial idle learning means carries out initial idle learning by averaging integral values in said integral control.

7. An apparatus for adjusting the intake air flow rate of an internal combustion engine according to claim 5, said apparatus further comprising; normal idle learning means for learning a control value when controlled by said idle rotation speed control means at the time of normal idle operation, and normal idle learning value storage means provided independent of said initial idle learning value storage means, for storing the learned result obtained during idle rotation speed control at the time of said normal idle operation.

8. An apparatus for adjusting the intake air flow rate of an internal combustion engine according to claim 5, wherein said idle rotation speed control means controls idle rotation speed by controlling the opening of an idle control valve disposed in a bypass passage connected to an intake air passage and bypassing said throttle valve.

* * * * *